United States Patent
Brown

(10) Patent No.: US 9,340,185 B1
(45) Date of Patent: May 17, 2016

(54) METHODS AND APPARATUS FOR BRAKING

(71) Applicant: Jeffrey C. Brown, Phoenix, AZ (US)

(72) Inventor: Jeffrey C. Brown, Phoenix, AZ (US)

(*) Notice: Subject to any disclaimer, the term of this patent is extended or adjusted under 35 U.S.C. 154(b) by 0 days.

(21) Appl. No.: 14/876,139

(22) Filed: Oct. 6, 2015

Related U.S. Application Data

(63) Continuation-in-part of application No. 14/532,325, filed on Nov. 4, 2014, now abandoned.

(51) Int. Cl.
| | |
|---|---|
| *G06F 19/00* | (2011.01) |
| *G06G 7/00* | (2006.01) |
| *B60T 7/04* | (2006.01) |
| *F16D 55/225* | (2006.01) |

(52) U.S. Cl.
CPC .............. *B60T 7/04* (2013.01); *F16D 55/225* (2013.01); *B60T 2201/12* (2013.01)

(58) Field of Classification Search
CPC ...... B60T 7/04; F16D 55/225; B60R 2201/12
USPC ......................................................... 701/70
See application file for complete search history.

(56) References Cited

U.S. PATENT DOCUMENTS

| | | | | |
|---|---|---|---|---|
| 6,155,385 A | * | 12/2000 | Basnett | ................... B60T 7/042 188/196 V |
| 2005/0133317 A1 | * | 6/2005 | Chen | ......................... B60T 7/22 188/193 |
| 2013/0245894 A1 | | 9/2013 | Huth et al. | |
| 2014/0034430 A1 | | 2/2014 | Fuse et al. | |

* cited by examiner

*Primary Examiner* — Khoi Tran
*Assistant Examiner* — Robert Nguyen
(74) *Attorney, Agent, or Firm* — The Noblitt Group, PLLC

(57) ABSTRACT

Methods and apparatus for braking may control a brake between three states. Methods and apparatus for braking may comprise a sensor for sensing information about a brake input device, may comprise a brake control system coupled with the brake and the brake input device, and may control the brake based on the sensed information and input to the brake input device. Methods and apparatus for braking may control the brake to engage a friction material with a rotor if the brake input device indicates the brake should be engaged, and to remove the friction material from contact with the rotor if the brake input device indicates the brake should not be engaged. Methods and apparatus for braking may determine a condition of imminent braking based on the sensed information and may control the brake to enter a ready-to-engage state accordingly.

20 Claims, 4 Drawing Sheets

METHODS AND APPARATUS FOR BRAKING

CROSS-REFERENCES TO RELATED APPLICATIONS

Figure 1:
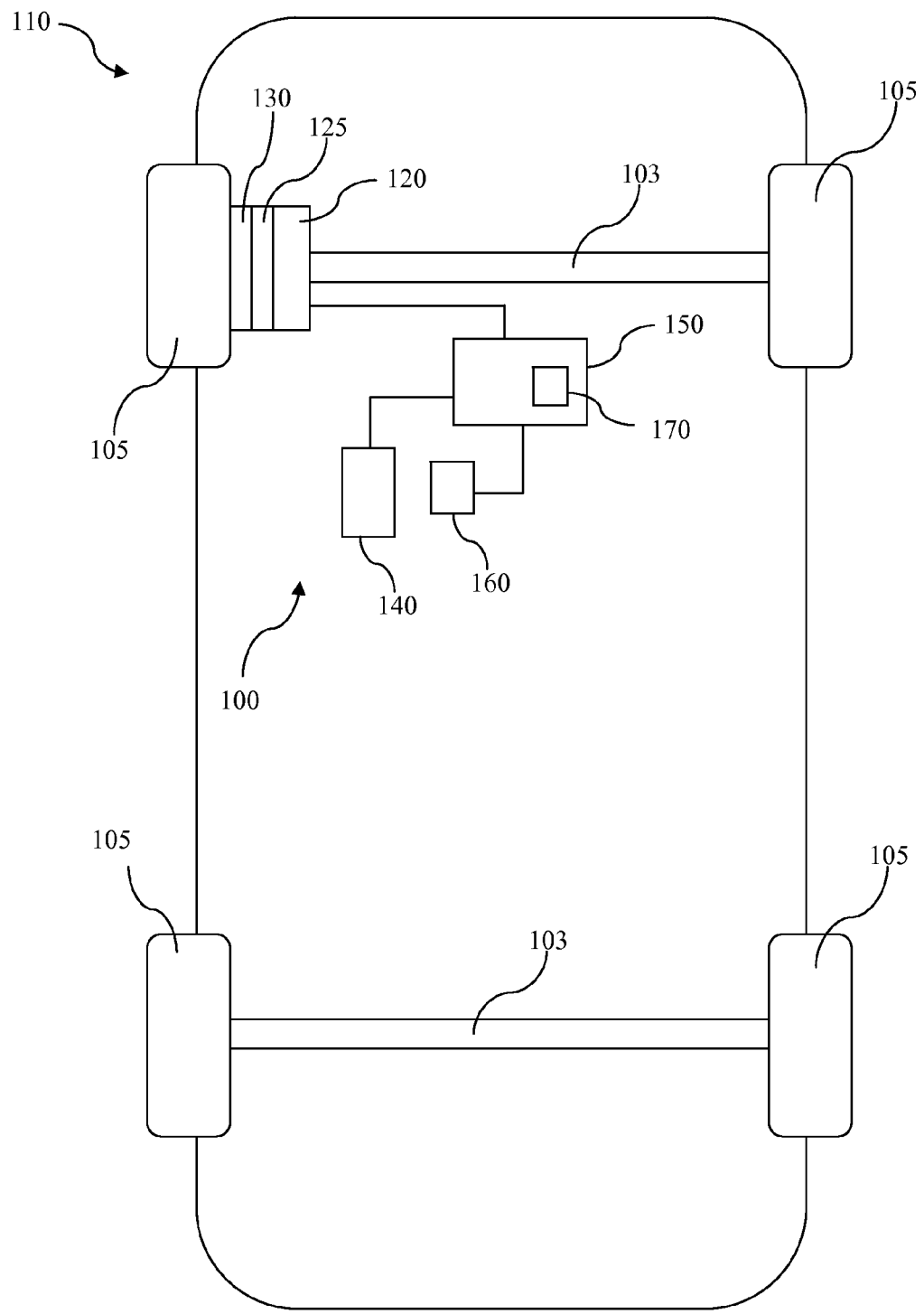

This application is a continuation-in-part of prior U.S. patent application Ser. No. 14/532,325, filed Nov. 4, 2014, and incorporates the disclosure of such application by reference.

BACKGROUND OF THE INVENTION

Current automotive brake designs force a friction material against a rotating surface of the brake when the brake is applied. The friction material maintains slight contact with a rotating surface of the brake when the brake is not applied. In a current disc brake design, the brake comprises a caliper activated by hydraulic pressure reacting on a piston that moves along with the brake pad and clamps the brake pad on a brake rotor. When the piston moves, a piston seal contacting the circumference of the piston slightly deforms. When the hydraulic pressure is relieved, for example at the end of the stop, the piston and brake pad are pulled away from the rotor by the piston seal returning to its non-deformed shape (called "rollback"). Calipers are designed such that the piston seal rollback leaves the brake pad in slight contact with the rotor. If an air gap is left between the brake pad and the rotor, the driver experiences a poor brake pedal feel due to the caliper having to travel an additional distance to move the pads back into engagement with the rotor. The brake pedal will have no initial resistance and does not quickly generate a vehicle deceleration, which results in a typical driver perception of an unresponsive and soft brake pedal.

Leaving the friction material in slight contact with the rotating surface, however, reduces fuel economy because a small amount of friction is applied to the rotating surface during non-braking conditions. Further, leaving the friction material in slight contact with the rotating surface causes additional wear on both components. This wear is a significant problem if the rotating surface does not rotate true, for example if the rotor has a run-out, which leads to irregular wear on the components and can result in pulsation, vibration, judder, and the like while braking. This is a major cause of warranty brake repair.

SUMMARY OF THE INVENTION

Methods and apparatus for braking according to various aspects of the present technology may control a brake between three states: an engaged state, a ready-to-engage state, and a disengaged state. In various exemplary embodiments, methods and apparatus for braking may comprise a sensor configured to sense information corresponding to a brake input device, may comprise a brake control system for controlling the brake and coupled with the brake and a brake input device, and may control the brake based on the sensed information and the input to the brake input device. Various methods and apparatus for braking may control the brake to engage a friction material with a rotor if the brake input device indicates the brake should be engaged, and to remove the friction material from contact with the rotor if the brake input device indicates the brake should not be engaged. Exemplary methods and apparatus for braking determine a condition of imminent braking based on the sensed information, for example if an object is near and/or touching the brake input device, and may control the brake to enter a ready-to-engage state accordingly.

BRIEF DESCRIPTION OF THE DRAWING FIGURES

A more complete understanding of the present technology may be derived by referring to the detailed description and claims when considered in connection with the following illustrative figures. In the following figures, like reference numbers refer to similar elements and steps throughout the figures.

Figure 2A:
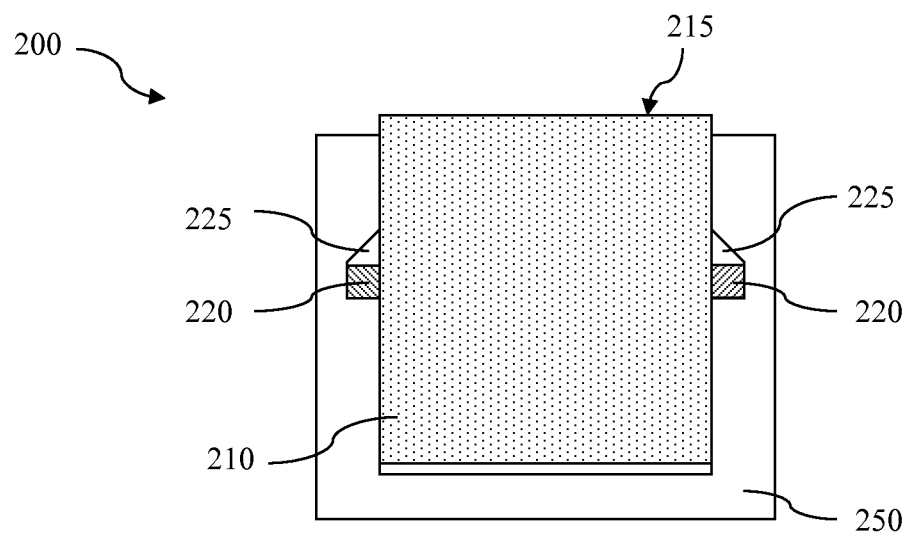
Figure 2B:
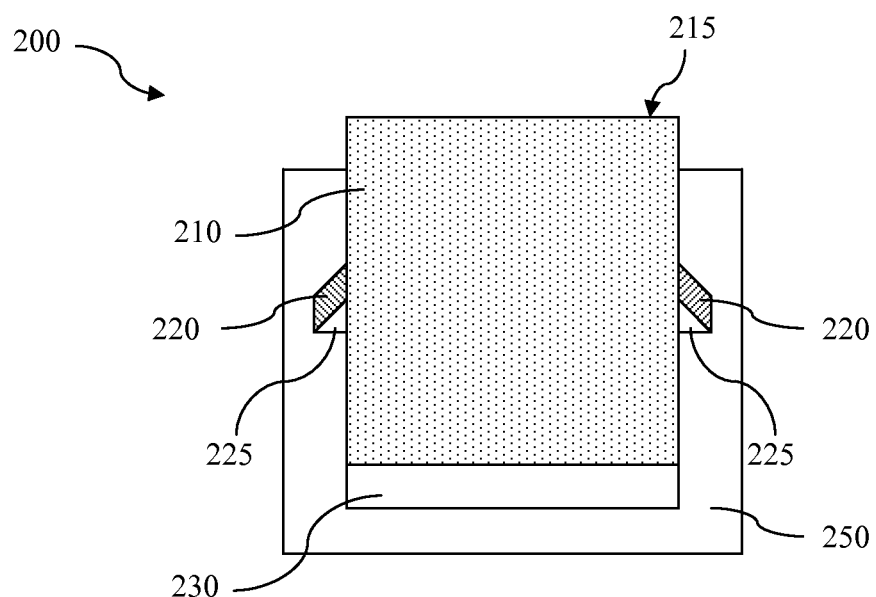
Figure 3:
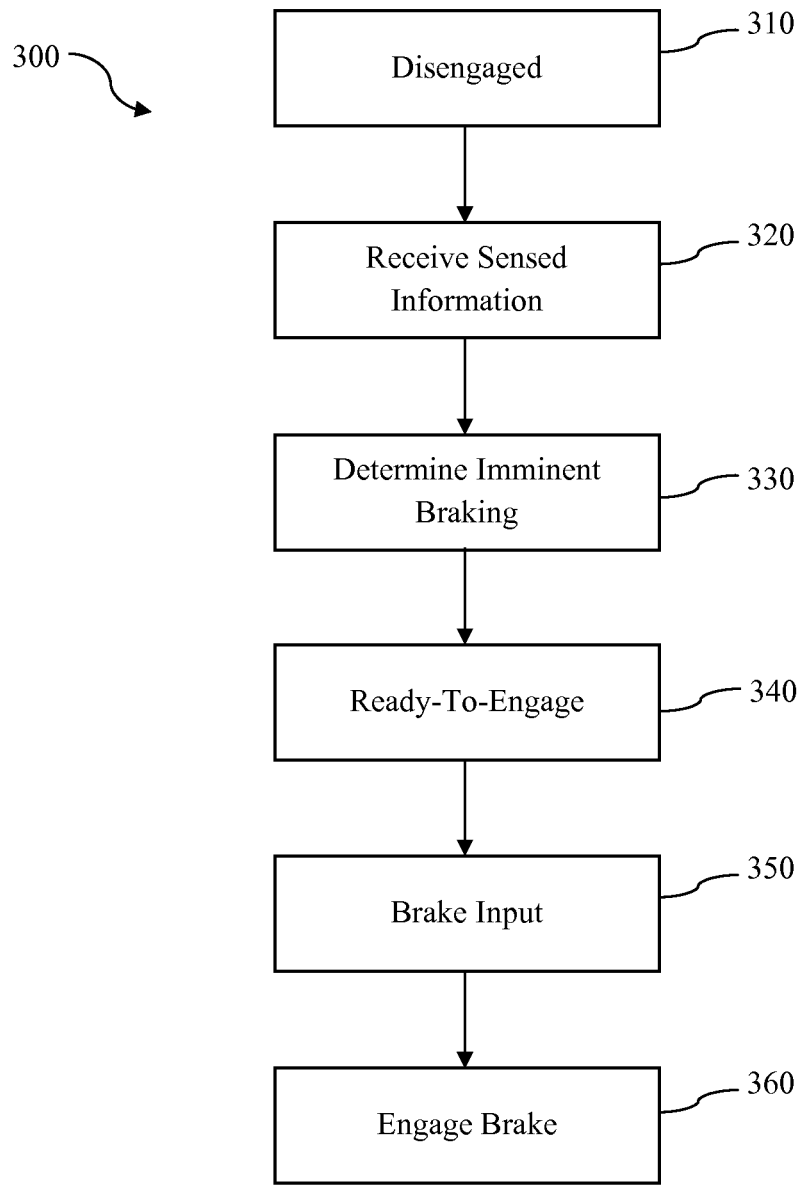
Figure 4:
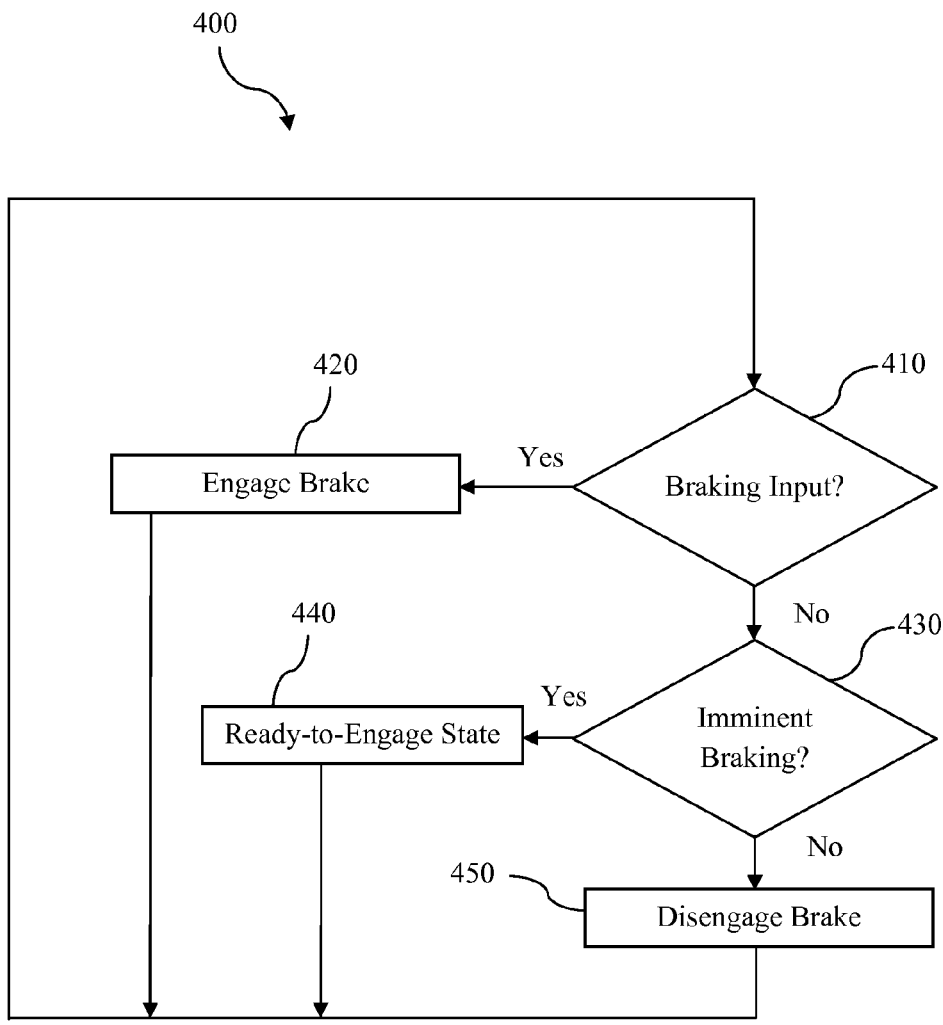

FIG. 1 is a block diagram representatively illustrating a vehicle comprising a brake system in accordance with an exemplary embodiment of the present technology;

FIG. 2A representatively illustrates a cross section of a caliper piston and a piston seal in a disengaged position in accordance with a first exemplary embodiment of the present technology;

FIG. 2B representatively illustrates a cross section of the caliper piston and piston seal in an engaged position in accordance with the first exemplary embodiment;

FIG. 3 is a flow chart illustrating a method for operating a brake in a ready-to-engage state in accordance with an exemplary embodiment of the present technology; and FIG. 4 is a flow chart illustrating a method for a brake system in accordance with an exemplary embodiment of the present technology.

Elements and steps in the figures are illustrated for simplicity and clarity and have not necessarily been rendered according to any particular sequence. For example, steps that may be performed concurrently or in different order are illustrated in the figures to help to improve understanding of embodiments of the present technology.

DETAILED DESCRIPTION OF EXEMPLARY EMBODIMENTS

The present technology may be described in terms of functional block components and various processing steps. Such functional blocks may be realized by any number of hardware or software components configured to perform the specified functions and achieve the various results. For example, exemplary embodiments of the present technology may employ various braking devices, brake input devices, brake control systems, computers, processors, sensors, and the like, for example disc brakes, drum brakes, brake calipers, brake shoes, brake pads, brake pedals, a vehicle electronic control unit ("ECU"), an anti-lock braking system ("ABS"), a proximity sensor, a vehicle hydraulic braking system, and the like, which may carry out a variety of functions. In addition, various aspects of the present technology may be practiced in conjunction with any number of vehicles or other applications requiring braking, for example an automobile, and the systems and methods described are merely exemplary applications for the technology. Further, exemplary embodiments of the present invention may employ any number of conventional techniques for sensing information, processing information, determining a condition based on information, controlling a brake, and the like.

Various representative implementations of the present technology may be applied to any suitable braking system. Certain representative implementations may include, for example, a brake system configured to cause a brake to remove a friction material from contact with a rotating brake surface (herein referred to as a "rotor") when braking is ceased, and to cause the brake and/or friction material to enter a ready-to-engage state when imminent braking is detected. For example, referring now to FIG. 1, a brake system 100 may operate in conjunction with a vehicle 110 having one or more wheels 105 coupled with one or more axles 103, wherein one or more rotors 130 may be directly or indirectly coupled with the one or more axles 103 and/or the one or more wheels 105. The brake system 100 may comprise a brake 120, a brake input device 140, and a brake control system 150 coupled between the brake input device 140 and the brake 120. The brake 120 may operate on a friction material 125 to apply friction to the rotor 130 to cause the rotor 130, and ultimately the vehicle 110, to slow down, stop, and/or remain stopped. The vehicle 110 shown in FIG. 1 is merely illustrative, and the brake system 100 may operate in conjunction with a vehicle 110 having any number and/or type of wheels and/or axles, any type of drive train, any type of axle, and the like.

The brake 120 applies the friction material 125 to the rotor 130 with a force. The brake 120 may comprise the friction material 125 and/or may be separate from the friction material 125. The brake 120 may be coupled with the friction material 125, or the friction material 125 may be placed such that the brake 120 can act on the friction material 125 without being coupled with the friction material 125. The brake 120 may support the friction material 125 and may be suitably coupled to a wheel hub, a chassis bracket, or the like.

The brake 120 may be coupled with the brake control system 150 such that the brake control system 150 is able to control the action of the brake 120. For example, the brake 120 may be hydraulically actuated, pneumatically actuated, electrically actuated, magnetically actuated, and/or the like. Accordingly, the brake 120 may be hydraulically, pneumatically, electrically, magnetically, and/or otherwise coupled with the brake control system 150. In an exemplary embodiment, the brake 120 is hydraulically actuated and coupled with the brake control system 150 by one or more hydraulic conduits. In various embodiments, the brake control system 150 may operate to move the brake 120 between an engaged position, a disengaged position, and a ready-to-engage position.

The brake 120 and rotor 130 may comprise any system for applying the friction material 125 to the rotor 130 with a force to cause friction to the rotor 130. Actively applying the friction material 125 to the rotor 130 with a force to cause the rotation of the rotor 130 to slow down, stop, remain stopped, and the like may be referred to herein as engaging the friction material 125 with the rotor 130, engaging the friction material 125, engaging the brake 120, and so on. For example, the rotor 130 may comprise a drum-shaped material and the brake 120 may comprise a brake shoe configured to apply the friction material 125 to a surface of the drum-shaped material, or the rotor 130 may comprise a disc-shaped material and the brake 120 may be configured to apply the friction material 125 to a surface of the disc-shaped material. In an exemplary embodiment, the brake 120 comprises a fixed or floating caliper having one or more pistons configured to apply the friction material 125 to opposite sides of a disc-shaped rotor with a force. In this exemplary embodiment, engaging the friction material 125 with the rotor 130 causes a clamping action on the rotor 130.

The friction material 125 and rotor 130 may comprise any suitable material for causing friction between the friction material 125 and the rotor 130. For example, the rotor 130 may comprise iron and the friction material 125 may comprise a ceramic brake pad, a semi-metallic brake pad, an organic-sintered brake pad, an aramid fiber-reinforced brake pad, and the like. For further example, the rotor 130 may comprise steel, aluminum, titanium, reinforced carbon, and the like.

Referring briefly to FIG. 2A, in an exemplary embodiment the brake 120 may comprise a caliper 250 having one or more pistons 210 and a piston seal 220 for each piston 210. A surface 215 of the one or more pistons 210 may be configured to apply (directly or indirectly) a force to the friction material 125, for example to engage the friction material 125 with the rotor 130 and/or to move the friction material 125 away from the rotor 130. A position in which the friction material 125 is not contacting the rotor 130 is referred to herein as a disengaged position. The piston seal 220 may provide a seal between the caliper 250 and the piston 210, and may comprise any suitable material for sealing, such as rubber, nylon, and the like. The piston seal 220 may have a quadrilateral cross-section, for example a square-cut seal. The piston seal 220 may be located in a recess 225 in the caliper 250 and/or in a recess in the piston 210.

Referring now to FIG. 2B, in an exemplary embodiment, when the brake 120 is controlled to engage the friction material 125 with the rotor 130, the piston 210 may be moved outward from the caliper 250 and a surface 215 of the piston 210 may apply a force to the friction material 125. The outward motion may be accomplished by filling a cavity 230 in the caliper 250 with a substance, such as a gas or a fluid. In an exemplary embodiment, the outward motion is accomplished by the brake control system 150 forcing a fluid, such as brake fluid, into the cavity 230. The outward motion may also be accomplished by any other suitable system or method, such as a solenoid, magnetic force such as supplied by an electromagnet, other electromechanical device, a mechanical device, and the like. The recess 225 may be configured to allow the piston seal 220 to deform, and when the piston 210 is moved outward, the piston seal 220 may be deformed in the recess 225 by the outward motion of the piston 210.

The piston 210 may need to move further than the piston seal 220 can deform (either due to the properties of the piston seal 220 or the shape of the recess 225), for example if wear has occurred on the friction material 125 and/or rotor 130 and further piston 210 travel may be required to engage the friction material 225. The piston 210 and/or piston seal 220 may be configured to allow the piston 210 to slide past the piston seal 220 when the piston 210 is moving outward and the piston seal 220 can deform no further. In this manner, the caliper 250 may be self-adjusting such that as the friction material 125 and/or rotor 130 wear down, substantially the same amount of outward travel is required for the piston 210 to engage the friction material 125 with the rotor 130.

In an exemplary embodiment, when the brake 120 is no longer controlled to engage the friction material 125 with the rotor 130, the piston 210 may be moved inward to the caliper 250. The inward motion may be accomplished by allowing the substance that was filling the cavity 230 to escape from the cavity 230. In an exemplary embodiment, the inward motion is accomplished by the brake control system 150 allowing the brake fluid to escape from the cavity 230. The deformed piston seal 220 returns to its non-deformed shape, for example as shown in FIG. 2A, and pulls the piston 210 inward to the caliper 250. In an exemplary embodiment, the piston seal 220 is configured to allow enough deformation that upon returning to its non-deformed shape, the piston seal 220 pulls the piston 210 inward enough that the friction material 125 is no longer touching the rotor 130, which is the disengaged position. The piston seal 220 may be configured to pull the piston 210 inward by about 0.001 mm to 2.0 mm, for example by about 0.005 mm to 0.050 mm. The piston seal 220 may be configured to pull the piston 210 inward to produce a gap between the friction material 125 and the rotor 130 which may exceed a maximum design run-out of the rotor 130, and may depend on hub and rotor 130 tolerances and design. For example a maximum design run-out of a particular rotor might be 0.025 mm, and the piston seal 220 may be configured to pull the piston 210 inward by a distance of 0.35 mm. Run-out values often range from 0.005 mm to 0.025 mm.

In another exemplary embodiment, the brake control system 150 may actively remove the substance from the cavity 230, the removal of the substance causing a reduction in pressure in the cavity 230 thereby causing the piston 210 to move inward to the caliper 250. The brake control system 150 may comprise any suitable system to remove the substance from the cavity 230. In an exemplary embodiment, the substance may comprise a fluid, such as brake fluid, and the brake control system 150 may comprise a hydraulic pump configured to remove the fluid from the cavity 230. The hydraulic pump may comprise a pump of the type used in an ABS, and/or may comprise a pump of the ABS. The brake control system 150 may be configured to activate the pump when braking is no longer desired. This exemplary embodiment may be used in conjunction with or without a deformable piston seal 220 as described above. In other exemplary embodiments, the inward motion of the piston 210 may be accomplished by any other suitable system or method, such as a solenoid, magnetic force such as supplied by an electromagnet, other electromechanical device, a mechanical device, a spring, and the like.

Referring again to FIG. 1, the brake input device 140 receives an input that the friction material 125 should be engaged with the rotor 130 to achieve a braking action (slowing, stopping, remaining stopped, and/or the like). The brake input device 140 may be coupled with the brake control system 150 in any suitable manner to provide the input to the brake control system 150. In an exemplary embodiment, the brake 120 may be hydraulically actuated, the brake control system 150 may be configured to control a hydraulic fluid, and the brake input device 140 may be coupled with a vacuum servo or master cylinder of the brake control system 150. In another embodiment, the brake 120 and brake control system 150 may be of a primarily electric design, and the brake input device 140 may be electrically coupled with the brake control system 150. The input may be provided by a user, by an automated driving system, by an automated emergency braking system, and/or the like.

The brake input device 140 may comprise any system for receiving an input that the friction material 125 should be engaged with the rotor 130, such as a brake pedal, lever, push button, touch screen button, squeeze grip, switch, and the like. The input may be provided by a user element, wherein the user element comprises part of the user such as a foot, hand, shoe, glove, and the like. In an exemplary embodiment, the brake input device 140 comprises a brake pedal assembly having a pedal coupled with a lever. For example, the brake pedal assembly may be coupled with a vacuum servo, electrical pedal stroke sensor, or master cylinder of the brake control system 150 to provide the input to the brake control system 150. In another embodiment, the brake input device 140 may comprise an output of a computer that is configured to determine when the friction material 125 should be engaged, and the output of the computer may be electrically coupled with the brake control system 150. The brake input device 140 may, however, be configured and coupled with the brake control system 150 in any suitable manner to receive and input that the friction material 125 should be engaged and to transmit the input to the brake control system 150.

The sensor 160 senses information corresponding to the brake input device 140. The sensor 160 is communicatively coupled with the brake control system 150 and may be arranged to sense information corresponding to a condition of imminent braking. A condition of imminent braking may comprise a condition in which an input to engage the friction material 125 may soon be given to the brake input device 140. For example, a condition of imminent braking may comprise a driver's foot positioned to apply a brake pedal but the brake pedal is not yet depressed, such as the foot positioned over the brake pedal, initial contact with the brake pedal without brake pedal stroke, otherwise touching the brake pedal without brake pedal stroke, moving off the gas pedal, and the like. In an exemplary embodiment, the sensor 160 may be electrically coupled with the brake control system 150 and may be positioned near the brake input device 140.

The sensor 160 may comprise any system for sensing information corresponding to a condition of imminent braking. In an exemplary embodiment, the sensor 160 may comprise a sensor capable of and/or configured to sense when an object (for example a user element) is proximate to and/or touching the brake pedal assembly (a "proximity sensor"). In an exemplary embodiment, the sensor 160 may comprise a sensor capable of and/or configured to sense when any object normally applied to the brake input device 140 may be proximate to and/or touching the brake input device 140. For example, the brake input device 140 may comprise a brake pedal assembly in an automobile, and the sensor 160 may be configured to sense when footwear material such as leather, synthetic material, rubber, plastic, and the like, sock material such as wool, cotton, and the like, flesh, and/or the like is proximate to and/or touching the brake pedal assembly. For further example, the brake input device 140 may comprise a grip brake assembly on a motorcycle, and the sensor 160 may be configured to sense when a hand, glove, or the like is proximate to and/or touching the brake handle.

In an exemplary embodiment, the sensor 160 may comprise a capacitive sensor configured and arranged to detect when an object is proximate to the brake input device 140 and/or when an object touches the brake input device 140. The capacitive sensor may be positioned in or near the brake input device 140. In another embodiment, the sensor 160 may comprise a photoelectric sensor configured and arranged to detect when an object is proximate to the brake input device 140. The photoelectric sensor may or may not be self-contained. The photoelectric sensor may be configured to transmit light and receive light that reflects off a nearby object; may be configured to receive light from a separate transmitter arranged to send a light beam, wherein the transmitter and photoelectric sensor may be arranged such that an object near the brake input device 140 will break the light beam; may be configured to transmit a light beam to fixed reflector and to receive the reflected light, wherein the photoelectric sensor and reflector may be arranged such that an object near the brake input device 140 will break the light beam; or the like. In other exemplary embodiments, the sensor 160 may comprise an acoustic sensor, a camera coupled with a processor configured to perform computer visions functions accordingly, a sensor coupled with the gas pedal to determine when and/or how quickly the gas pedal is released, and the like.

The brake control system 150 receives input from the brake input device 140 and controls the brake 120 accordingly. The brake control system 150 may be suitably coupled with the brake 120 and the brake input device 140. In an exemplary embodiment, the brake 120 is hydraulically actuated and the brake control system 150 is fluidly coupled with the brake 120 via one or more fluid conduits, such as by a brake line transporting brake fluid.

The brake control system 150 may comprise any suitable system for controlling the brake 120, such as a hydraulic-based system for controlling a hydraulically actuated brake 120, an electrically-based system for controlling an electromagnetically actuated brake 120, and the like. In an exemplary embodiment, the brake control system 150 may comprise conventional automobile brake system components, such as a vacuum servo, master cylinder, hydraulic valves, ABS, fluid conduits, a fluid reservoir, and the like. In an exemplary embodiment, the brake control system 150 comprises an ABS.

In response to an input from the brake input device 140 indicating that the friction material 125 should be engaged, the brake control system 150 may be configured to control the brake 120 to engage the friction material 125 with the rotor 130, for example by forcing fluid to the brake 120. In response to an input from the brake input device 140 indicating that the friction material 125 should not be engaged, for example if the brake pedal is released, the brake 120 and the brake control system 150 may be configured to cause the friction material 125 to move to the disengaged position, where there friction material 125 is not in contact with the rotor 130. In an exemplary embodiment, in response to an input from the brake input device 140 indicating that the friction material 125 should not be engaged, the brake control system 150 may control the brake 120 to cease engaging the friction material 125, for example by allowing the fluid to escape the brake 120.

The brake 120 may comprise the caliper 250 having the piston seal 220 or other spring-back type of force configured to move the piston 210 to the disengaged position. In an exemplary embodiment, the brake control system 150 may comprise a hydraulic pump, and may be configured to control the pump to actively remove fluid from the brake 120 to cause the friction material to move to the disengaged position in response to an input indicating the friction material 125 should not be engaged. The above exemplary embodiments may also be applied to a pneumatically actuated brake 120, wherein the brake control system 150 is configured to operate on a gas.

The brake control system 150 may be coupled with the sensor 160 to receive sensed information about the brake input device 140. The brake control system 150 may be configured to determine a condition of imminent braking based on the sensed information. The brake control system 150 may be further configured to control the brake 120 to enter a ready-to-engage state in response to the condition of imminent braking. The ready-to-engage state comprises the friction material 125 positioned between an engaged position and the disengaged position (the "ready-to-engage position"). The ready-to-engage state allows the friction material 125 to move less distance to engage the rotor 130 than it would from the disengaged position. In an exemplary embodiment, the ready-to-engage state comprises the friction material 125 positioned such that minimal travel will be required to engage the friction material 125 with the rotor 130. The friction material 125 may be almost touching the rotor 130. In an exemplary embodiment, the ready-to-engage state comprises the friction material 125 lightly touching (in slight contact with) the rotor 130 with no force or approximately enough force applied by the brake 120 to keep the friction material 125 lightly touching the rotor. The friction material 125 lightly touching the rotor 130 may comprise an amount of touching that is not perceivable as drag by the driver of the vehicle.

The brake control system 150 may control the brake 120 to enter the ready-to-engage state in any suitable manner. The brake control system 150 may be configured to control the brake 120 to enter the ready-to-engage state from the engaged position or the disengaged position. For example, if the brake 120 was being controlled to engage the friction material 125, and the brake control system 150 received input indicating the friction material 125 should not be engaged, but determined that a condition of imminent braking exists because an object is proximate to the brake input device 140, the brake control system 150 may control the brake 120 to move the friction material 125 away from the rotor 130 to the ready-to-engage position instead of the disengaged position. The brake control system 150 may be further configured to control the brake 120 to move the friction material 125 to the disengaged position from the ready-to-engage position if the condition of imminent braking ceases to exist.

For further example, if the brake 120 is in the disengaged position and the brake control system 150 determines a condition of imminent braking exists, the brake control system 150 may control the brake 120 to move the friction material 125 toward the rotor 130 to the ready-to-engage position. The brake control system 150 may be further configured to control the brake 120 to engage the friction material 125 from the ready-to-engage state if the brake control system 150 receives input indicating the friction material 125 should be engaged (a "braking input"). In an exemplary embodiment, the brake 120 is hydraulically actuated, and the brake control system 150 may be configured to force an amount of fluid to the brake 120 to cause the friction material 125 to move from the disengaged position to the ready-to-engage position, and/or from the ready-to-engage position to the engaged position. The brake control system 150 may be further configured to allow enough fluid to be removed from the brake 120 so that the friction material 125 moves from the engaged position to the ready-to-engage position, and/or from the ready-to-engage position to the disengaged position. The removal of the fluid may be accomplished by action of the piston seal 220 returning to a non-deformed shape and moving the piston 210, by a hydraulic pump, and/or the like.

The brake control system 150 may be configured in any suitable manner to determine a condition of imminent braking based on the sensed information. For example, if the sensor 160 comprises a proximity and/or touch sensor, the brake control system 150 may be configured to determine that a condition of imminent braking exists when it receives information from the sensor 160 that an object is proximate to and/or touching the brake input device 140. In an exemplary embodiment, the sensor 160 may be coupled with a hydraulic valve and/or other components of the brake control system 150 such that when the sensor 160 detects an object proximate to and/or touching the brake input device 140, the sensor 160 transmits a signal to the hydraulic valve and/or other components causing the components to direct hydraulic fluid to cause the brake to enter a ready-to-engage state. The brake control system 150 may be further configured to require, for the determination of the condition of imminent braking, that the brake input device 140 is not receiving input indicating the friction material 125 should be engaged.

In an embodiment, a minimal input to the brake input device 140 may be considered insufficient for an input indicating the friction material 125 should be engaged. For example, a brake pedal might have an amount of "play" that is not converted to an input to the brake control system 150. A threshold for input to the brake input device 140 may be set, any input below which may not be considered an input indicating the friction material 125 should be engaged. For example, the brake control device 140 may comprise a brake pedal assembly, and the brake control system 150 may be configured such if it receives information from the sensor 160 that a foot is proximate to and/or touching the brake pedal, and the brake pedal is only minimally or is not depressed, it may determine that a condition of imminent braking exists.

In an embodiment, the brake control system 150 may be configured to determine, based on the sensed information, that a condition of imminent braking exists when an object is proximate to and/or touching the brake input device 140 and was not previously proximate to and/or touching the brake input device 140. For example, if a driver's foot presses the brake input device 140 and then releases the brake input device 140, while the foot is still near the brake input device 140 the brake control system 150 may be configured to determine that a condition of imminent braking does not yet exist. The brake control system 150 may be configured to determine that a condition of imminent braking exists once the foot moves away from the brake input device 140 (for example to a gas pedal) and is brought back into proximity of and/or touching the brake input device 140. In an embodiment, the brake control system 150 may be configured to determine, based on the sensed information, that a condition of imminent braking exists when an object is proximate to and/or touching the brake input device 140 for a predetermined period of time. In another embodiment, the brake control system 150 may be configured to determine a condition of imminent braking exists when another input, such as a gas pedal, is released, and may depend on how quickly it was released.

In an exemplary embodiment, the brake system 100 may comprise a plurality of sensors 160 arranged and configured to collectively sense information corresponding to an imminent braking condition, and the brake control system 150 may be coupled with and configured to receive the sensed information from the plurality of sensors 160 and to determine a condition of imminent braking based on the plurality of sensed information. For example, the brake system 100 may comprise two sensors 160 each configured and arranged to independently sense information corresponding to a condition of imminent braking, and the brake control system 150 may be configured to determine a condition of imminent braking when the sensed information from at least one, or in another embodiment from both, of the sensors 160 indicates a condition of imminent braking.

In an exemplary embodiment, a processor 170 may be configured to determine that a condition of imminent braking exists. The processor 170 may comprise a vehicle electronic control unit (ECU), a microcontroller, a central processing unit, an application-specific integrated circuit, a field-programmable gate array, a programmable logic controller, any other type of suitable logic device, and/or any combination thereof. In an exemplary embodiment, the processor 170 may be a shared resource among one or more other systems of the vehicle 110. For example, the processor 170 may be shared with the ABS. In another embodiment, the processor 170 may be dedicated to the brake control system 150. A single processor 170 may determine and/or control all brakes 120 of the brake system 100, or each brake 120 or set of brakes 120 may have its own processor. In an exemplary embodiment, the brakes 120 are controlled in two groups for safety, in case one group malfunctions. In this embodiment, the brake control system 150 may comprise two processors 170, one for each group of brakes 120.

The brake system 100 engages the friction material 125 with the rotor 130 when braking is desired, removes the friction material 125 from contact with the rotor 130 when braking is not desired (disengaged), and places the brake 120 in a ready-to-engage state in response to a condition of imminent braking. The brake system 100 may determine a condition of imminent braking, may place the brake 120 in a ready-to-engage state, may engage the friction material 125, and may remove the friction material 125 from contact with the rotor 130 in any appropriate manner. Referring to FIG. 3, for example, the brake control system 150 may be controlling the brake 120 to be disengaged (310), may receive information from the sensor 160 (320), may determine a condition of imminent braking (330) based on the received information, and may then control the brake 120 to enter a ready-to-engage state (340). The brake control system 150 may then receive input from the brake input device indicating the friction material 125 should be engaged (350) and may control the friction material 125 to be engaged (360) in response to the input.

Therefore, even though the friction material 125 was not touching the rotor 130 while the brake 120 was disengaged, the driver will not experience a poor brake feel when a braking input is given to the brake input device 140 because the brake 120 was controlled to be in the ready-to-engage state prior to the braking input. Unnecessary friction may be removed from the rotor when braking is not desired, while still maintaining an acceptable brake feel without excessive brake travel required to engage the brakes. Therefore, during a significant portion of a vehicle's life the friction material may not be contacting the rotor when the vehicle is moving.

In one embodiment, as disclosed in FIG. 4, the brake control system may position the friction material 125 in the disengaged position (450) only in response to the input from the brake input device 140 indicating the brake 120 should not engage the friction material 125 with the rotor 130 and the sensor 160 indicating that the condition of imminent braking is negative. For example, the brake control system in one embodiment is configured to control the brake to position the friction material 125 in the disengaged position (450) only in response to the input, such as a brake pedal sensor signal, from the brake input device 140 indicating the brake 120 should not engage the friction material 125 with the rotor 130 and the sensor 160 signal indicating the condition of imminent braking is absent.

Referring now to FIG. 4, a method for a brake system (400) may comprise controlling the brake 120 to engage the friction material 125 (420) in response to receiving an input from the brake input device 140 indicating that the friction material 125 should be engaged (410), controlling the brake 120 to enter a ready-to-engage state (440) in response to determining a condition of imminent braking (430), and controlling the brake 120 to place the friction material 125 in a disengaged position (450) when the input from the brake input device 140 does not indicate that the brake 120 should be engaged and a condition of imminent braking is not present. The method for a brake system (400) may be repeated such that the brake 120 may continue to be engaged (420) if the input to the brake device 140 continues to indicate that the friction material 125 should be engaged (410), the brake 120 may continue to be in a ready-to-engage state (440) if the brake control system 150 continues to determine that a condition of imminent braking is present (430), the brake 120 may continue to be in a disengaged position (450) if the brake input device 140 continues to not indicate that the brake 120 should be engaged and a condition of imminent braking continues to not be present, and the like. The disengaged position may comprise a position in which the friction material 125 is not in contact with the rotor 130. Determining a condition of imminent braking (430) may be based on information from the sensor 160. The ready-to-engage state may comprise the brake 120 positioned such that the friction material 125 is between the disengaged position and an engaged position in which the friction material 125 is engaged with the rotor 130.

The brake 120 may comprise a disc brake having a caliper 250 with a piston 210 and piston seal 220, and controlling the brake 120 to engage the friction material 125 (420) may comprise engaging, by the piston 210, the friction material 125 with the rotor 130, and controlling the brake 120 to enter a ready-to-engage state (440) may comprise the piston seal 220 returning to its non-deformed state and causing the piston 210 to move. The brake 120 may comprise a hydraulically-actuated piston and the brake control system 150 may comprise a hydraulic pump, and controlling the brake 120 to position the friction material 125 in a disengaged position (450) may comprise controlling the hydraulic pump to remove an amount of fluid from the brake 120 to cause the piston to move to the disengaged position. Determining a condition of imminent braking (430) may comprise determining, according to the sensed information, that an object is proximate to the brake input device 140. For example, the sensor 160 may comprise a capacitive or photoelectric sensor configured and arranged to determine when an object is proximate to and/or touching the brake input device 140.

The particular implementations shown and described are illustrative of the invention and its best mode and are not intended to otherwise limit the scope of the present invention in any way. Indeed, for the sake of brevity, conventional manufacturing, connection, preparation, and other functional aspects of the system may not be described in detail. Furthermore, the connecting lines shown in the various figures are intended to represent exemplary functional relationships and/or steps between the various elements. Many alternative or additional functional relationships or physical connections may be present in a practical system.

In the foregoing description, the invention has been described with reference to specific exemplary embodiments. Various modifications and changes may be made, however, without departing from the scope of the present invention as set forth. The description and figures are to be regarded in an illustrative manner, rather than a restrictive one and all such modifications are intended to be included within the scope of the present invention. Accordingly, the scope of the invention should be determined by the generic embodiments described and their legal equivalents rather than by merely the specific examples described above. For example, the steps recited in any method or process embodiment may be executed in any appropriate order and are not limited to the explicit order presented in the specific examples. Additionally, the components and/or elements recited in any system embodiment may be combined in a variety of permutations to produce substantially the same result as the present invention and are accordingly not limited to the specific configuration recited in the specific examples.

Benefits, other advantages and solutions to problems have been described above with regard to particular embodiments. Any benefit, advantage, solution to problems or any element that may cause any particular benefit, advantage or solution to occur or to become more pronounced, however, is not to be construed as a critical, required or essential feature or component.

The terms "comprises", "comprising", or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the same.

The invention claimed is:

1. A method for a brake system having a brake, a brake input device, and a brake control system coupled between the brake input device and the brake, the method comprising:
    receiving, by the brake control system, an input from the brake input device;
    controlling, by the brake control system, the brake to engage the friction material with a rotor in response to the input indicating the brake should engage the friction material with the rotor;
    sensing, by a sensor coupled with the brake control system, information corresponding to the brake input device;
    determining, by the brake control system and based on the sensed information, a condition of imminent braking;
    controlling, by the brake control system, the brake to enter a ready-to-engage state in response to the condition of imminent braking, wherein the friction material is closer to the rotor in the ready-to-engage state than in the disengaged position but not in contact with the rotor; and
    controlling, by the brake control system, the brake to position the friction material in a disengaged position only in response to the input and the sensed information indicating the brake should not engage the friction material with the rotor, wherein the disengaged position comprises a position in which the friction material is not in contact with the rotor.

2. The method of claim 1, wherein the ready-to-engage state comprises the brake positioned such that the friction material is between the disengaged position and an engaged position, wherein in the engaged position the friction material is in contact with the rotor.

3. The method of claim 1, wherein the brake comprises a caliper having a piston positioned within a piston seal, and wherein:
    controlling the brake to engage the friction material with the rotor comprises engaging, by the piston, the friction material with the rotor; and
    controlling the brake to position the friction material in a disengaged position comprises positioning, by the piston seal, the piston in the disengaged position.

4. The method of claim 1, wherein the brake comprises a hydraulically-actuated piston and the brake control system comprises a hydraulic pump, and wherein:
    controlling the brake to position the friction material in the disengaged position comprises controlling the hydraulic pump to remove an amount of fluid from the brake to cause the piston to move to the disengaged position.

5. The method of claim 1, wherein determining a condition of imminent braking based on the sensed information comprises at least one of determining that an object is proximate to the brake input device and determining that an object is touching the brake input device.

6. The method of claim 5, wherein the sensor comprises a capacitive sensor configured and arranged to at least one of: detect when an object is proximate to the brake input device, and detect when an object touches the brake input device.

7. The method of claim 5, wherein the sensor comprises a photoelectric sensor configured and arranged to detect when an object is proximate to the brake input device.

8. A brake system, comprising:
    a brake configured to engage a friction material with a rotor;
    a brake input device configured to receive an input;

a sensor configured to sense information corresponding to the brake input device; and
a brake control system coupled between the brake input device and the brake, and coupled with the sensor, wherein the brake control system is configured to:
receive the input from the brake input device;
control the brake to engage the friction material with the rotor in response to the input indicating the brake should engage the friction material with the rotor;
control the brake to position the friction material in a disengaged position only in response to the input and the sensed information indicating the brake should not engage the friction material with the rotor, wherein the disengaged position comprises a position in which the friction material is not in contact with the rotor;
determine a condition of imminent braking based on the sensed information; and
control the brake to enter a ready-to-engage state in response to the condition of imminent braking, wherein the friction material is closer to the rotor in the ready-to-engage state than in the disengaged position but not in contact with the rotor.

9. The brake system of claim 8, wherein the ready-to-engage state comprises the brake positioned such that the friction material moves between the disengaged position and an engaged position, wherein in the engaged position the friction material is in contact with the rotor.

10. The brake system of claim 8, wherein:
the brake comprises a caliper having a piston positioned within a piston seal, wherein:
the piston is configured to engage the friction material with the rotor when the brake is controlled to engage the friction material with the rotor; and
the piston seal is configured to position the piston in the disengaged position when the brake is controlled to position the friction material in the disengaged position.

11. The brake system of claim 8, wherein:
the brake comprises a hydraulically-actuated piston;
the brake control system comprises a hydraulic pump; and
controlling the brake to position the friction material in the disengaged position comprises controlling the hydraulic pump to remove an amount of hydraulic fluid from the brake to cause the piston to move to the disengaged position.

12. The brake system of claim 8, wherein determining a condition of imminent braking based on the sensed information comprises at least one of determining that an object is at proximate to the brake input device and determining that an object is touching the brake input device.

13. The brake system of claim 12, wherein the sensor comprises a capacitive sensor configured and arranged to at least one of: detect when an object is proximate to the brake input device, and detect when an object touches the brake input device.

14. The brake system of claim 12, wherein the sensor comprises a photoelectric sensor configured and arranged to detect when an object is proximate to the brake input device.

15. The brake system of claim 8, wherein:
the brake comprises a hydraulically-actuated piston;
the brake control system comprises a mechanical spring; and
controlling the brake to position the friction material in the disengaged position comprises urging the friction material to the disengaged position.

16. A brake system operating in conjunction with a user input and a user element, comprising:
a brake configured to selectively engage a friction material with a rotor;
a brake input device configured to receive the user input;
a sensor positioned at least one of on and proximate to the brake input device, wherein the sensor generates a signal when the user element is at least one of proximate to and touching the brake input device; and
a brake control system coupled between the brake input device and the brake, and coupled with the sensor, wherein the brake control system:
receives the user input from the brake input device;
controls the brake to engage the friction material with the rotor in response to the user input indicating the brake should engage the friction material with the rotor;
determines a condition of imminent braking based on the sensor signal, wherein the condition of imminent braking comprises a condition in which:
the sensor signal indicates the user element is located at least one of proximate to and touching the brake input device; and
the user input indicates the brake should not engage the friction material with the rotor;
controls the brake to enter a ready-to-engage state in response to the condition of imminent braking by the sensor signal, wherein the ready-to-engage state comprises:
the brake positioned such that the friction material is moved between a disengaged position in which the friction material is not in contact with the rotor and an engaged position in which the friction material is in contact with the rotor, and
the friction material is closer to the rotor in the ready-to-engage state than in the disengaged position; and
controls the brake to position the friction material in the disengaged position only in response to the user input indicating the brake should not engage the friction material with the rotor and the sensor signal indicating the condition of imminent braking is absent.

17. The brake system of claim 16, wherein:
the brake comprises a caliper comprising a piston positioned within a piston seal, wherein:
the piston engages the friction material with the rotor when the brake is controlled to engage the friction material with the rotor; and
the piston seal positions the piston in the disengaged position when the brake is controlled to position the friction material in the disengaged position.

18. The brake system of claim 16, wherein:
the brake comprises a hydraulically-actuated piston;
the brake control system comprises a hydraulic pump; and
controlling the brake to position the friction material in the disengaged position comprises controlling the hydraulic pump to remove an amount of fluid from the brake to cause the piston to move to the disengaged position.

19. The brake system of claim 16, wherein the sensor comprises a capacitive sensor configured and arranged to at least one of: detect when the user element is proximate to the brake input device, and detect when the user element touches the brake input device.

20. The brake system of claim 16, wherein the sensor comprises a photoelectric sensor configured and arranged to detect when the user element is proximate to the brake input device.

* * * * *